United States Patent
Matsuoka et al.

(10) Patent No.: US 7,184,947 B2
(45) Date of Patent: Feb. 27, 2007

(54) DOCUMENT ANONYMITY SETTING DEVICE, METHOD AND COMPUTER READABLE RECORDING MEDIUM RECORDING ANONYMITY SETTING PROGRAM

(75) Inventors: Hidesato Matsuoka, Kawasaki (JP); Ryo Ochitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 09/921,924

(22) Filed: Aug. 6, 2001

(65) Prior Publication Data
US 2002/0091516 A1 Jul. 11, 2002

(30) Foreign Application Priority Data
Jan. 5, 2001 (JP) .............................. 2001-000641

(51) Int. Cl.
G06F 17/28 (2006.01)
G06F 17/20 (2006.01)
G10L 15/00 (2006.01)
G10L 15/18 (2006.01)

(52) U.S. Cl. ............................... 704/8; 704/4; 704/257
(58) Field of Classification Search ..................... 704/4, 704/239, 236, 245, 243, 9, 8, 257; 706/45, 706/47; 713/168
See application file for complete search history.

(56) References Cited

U.S. PATENT DOCUMENTS

| | | | | |
|---|---|---|---|---|
| 5,860,063 A * | 1/1999 | Gorin et al. | ................. | 704/257 |
| 6,449,718 B1 * | 9/2002 | Rucklidge et al. | .......... | 713/168 |
| 6,532,459 B1 * | 3/2003 | Berson | .......................... | 707/3 |
| 6,611,846 B1 * | 8/2003 | Stoodley | ................. | 707/104.1 |
| 6,654,724 B1 * | 11/2003 | Rubin et al. | ................... | 705/3 |
| 6,732,113 B1 * | 5/2004 | Ober et al. | ................. | 707/102 |
| 6,785,812 B1 * | 8/2004 | Botham et al. | ............. | 713/168 |

OTHER PUBLICATIONS

Mani et al. Identifying Unknown Proper Names in Newswire Text, The MITRE Coporation, 1993, pp. 44-53.*
Anthony F. Gallippi, Learning to Recognize Names Across Languages, Proceedings of the 16th conference on Computational linguistics, vol. 1, 1996, 424-429.*
Wolinski et al. Automatic processing of proper names in texts, 1995, Proceedings of the seventh conference on European chapter of the Association for Computational Linguistics, pp. 23-30.*

(Continued)

Primary Examiner—Richemond Dorvil
(74) Attorney, Agent, or Firm—Staas & Halsey LLP

(57) ABSTRACT

A document anonymity setting device comprises a document input means inputting a document, a specificity calculating means extracting an expression specifying a person from the input document and for calculating a specificity to evaluate a degree of specificity at which the expression specifying a person, and an anonymity setting processing means rewriting with anonymity setting a expression in the input document having a specificity which is greater than a predetermined threshold. The specificity calculating unit extracts a person name and a modification expression from the input document and calculates a specificity to evaluate a degree of specificity at which the person name and modification expression thus extracted can specify a person. The anonymity setting processing unit rewrites a person name and a modification expression which have a specificity greater than a predetermined threshold through rewriting to meaningless expression, rewriting to low specificity setting, and rewriting to encrypted expression.

7 Claims, 16 Drawing Sheets

OTHER PUBLICATIONS

Ruch et al. Medical Document Anonymizaion with a Semantic Lexicon, Nov. 2000, The American Medical Informatics Association 2000 Symposium.*

Abstracts from, The American Medical Informatics Association 2000 Symposium, Session S81—Clinical Information Confidentiality and Security, Wednesday, Nov. 8, 2000.*

* cited by examiner

FIG. 8

| PERSON IDENTIFICATION ID | TYPE OF NOTATION | NOTATION | PROBABILITY |
|---|---|---|---|
| P001 | NAME | JOHN | 0.3 |
| P001 | NAME | JOHN SMITH | 0.9 |
| P001 | MODIFICATION | j_smith@a.company.com | 1.0 |
| P001 | MODIFICATION | IN INFORMATION APPARATUS SALES DIVISION | 0.2 |
| ... | ... | ... | ... |
| P003 | NAME | SMITH | 0.2 |
| P003 | MODIFICATION | SOHKA CITY, SAITAMA PREFECTURE | 0.6 |
| ... | ... | ... | ... |
| P009 | MODIFICATION | SOHKA CITY, SAITAMA PREFECTURE | 0.6 |
| ... | ... | ... | ... |

FIG.11

| IDENTIFICATION | THRESHOLD | ANONYMITY SETTING METHOD |
|---|---|---|
| 00 | LAST THRESHOLD | TURNED LETTER |
| 01 | TH1 | GENERALIZATION |
| 02 | TH2 | GENERALIZATION |
| 03 | TH3 | LOW SPECIFICITY |
| 04 | TH4 | ENCODE |
| ⋮ | ⋮ | ⋮ |
| n | THn | TURNED LETTER |

26

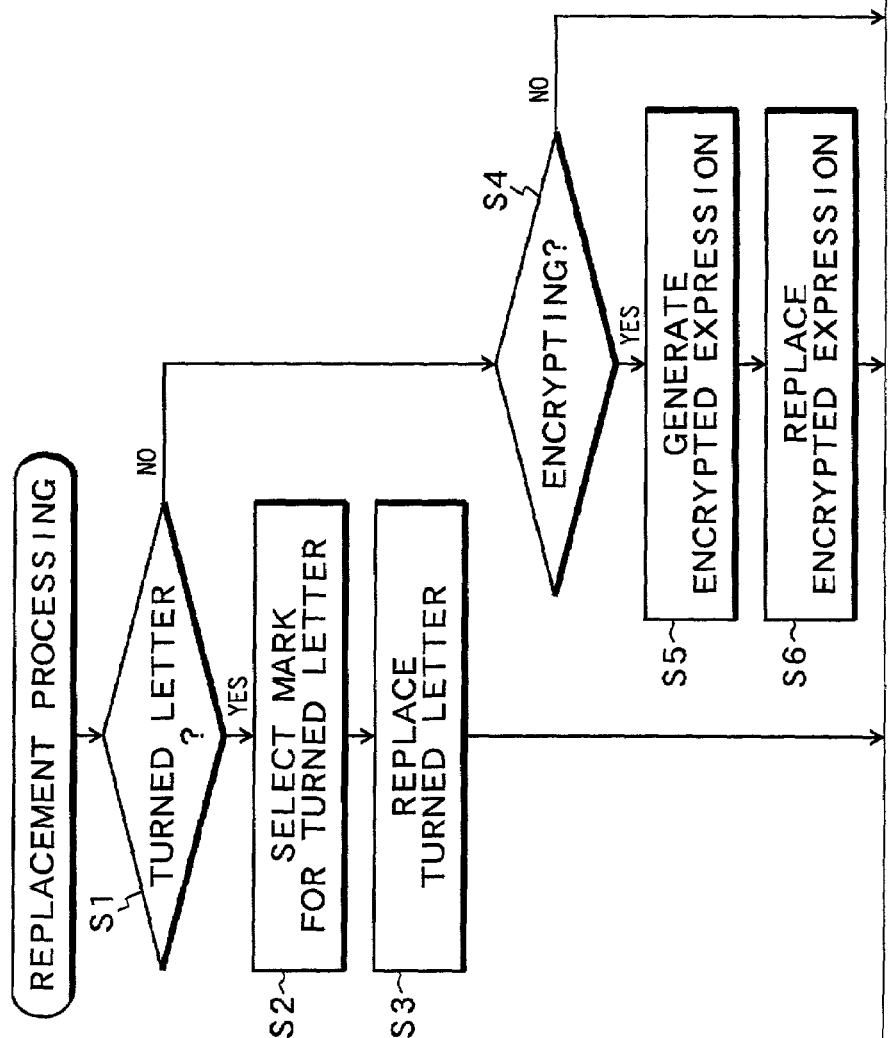

DOCUMENT ANONYMITY SETTING DEVICE, METHOD AND COMPUTER READABLE RECORDING MEDIUM RECORDING ANONYMITY SETTING PROGRAM

BACKGROUND OF THE INVENTION

1. Field of the Invention

The present invention relates to a document anonymity setting device and method which rewrite with anonymity an expression as to specify a person in a with an anonymity expression document and a computer readable recording medium recording an anonymity setting program, and more particularly to a document anonymity setting device for evaluating the degree of intensity at which the expression specifies a person and setting an anonymity and a computer readable recording medium recording and an anonymity setting program.

2. Description of the Related Arts

In recent years, the document data which include personal information. For example, there are a questionnaire answer, a complaint or an electronic mail. There is a problem in that the existence of a company is threatened if the personal information leak out of a company. Therefore, it is necessary to properly conceal information about personal information before analyzing the document data.

Conventionally, personal information such as person name, phone number, credit card number, and etc. included in the document data or the like have been concealed manually. In the conventional concealment of the personal information, however, it is hard for a worker to decide whether a modification expression related to a personal name or a person which is described belongs to information protected as the personal information or does not need to be protected like information about a public person. Therefore, there is a problem in that the properness for concealing the personal information is varied depending on each person. For this reason, when a worker conceals a personal data the worker's skill and knowledge for concealing the personal information should exceed a certain level. Therefore, the cost of concealing the personal information manually is increased easily.

SUMMARY OF THE INVENTION

It is an object of the present invention to provide a document anonymity setting device and method capable of mechanizing the concealment of personal information to reduce a working cost, and furthermore, adjusting the degree of the concealment if necessary and a computer readable recording medium recording an anonymity setting program.

The present invention provides a document anonymity setting device comprising a document input unit for inputting a document of which a personal information is concealed, a specificity calculating unit for extracting an expression specifying a person from the input document and for calculating a specificity of an extracted expression which the can specify a person, and an anonymity setting processing unit for rewriting an expression in the input document having a specificity which is greater than a predetermined threshold. In the present invention, therefore, the degree of specificity of an expression specifying a person is calculated before rewriting with the anonymity expressions in a document. As a result, a document can be rewritten with anonymity expressions automatically or semi-automatically at the required degree of specificity. Thus, the rewriting with anonymity expressions can be carried out efficiently and a working cost can be reduced.

The specificity calculating unit extracts a person name from input document and calculates a specificity to evaluate a degree of intensity at which the person name thus extracted can specify a person, and the anonymity setting processing unit giving anonymity to a person name having a specificity which is greater than a predetermined threshold. Moreover, the specificity calculating unit extracts a modification expression which modify a person name and can specify a person. For example, "Watson got Novel prize with analysis of Molecular Structure of Nucleic Acids". In the example, "Watson" is a person name. "got Novel prize" and "with analysis of Molecular Structure of Nucleic Acids" are modification expressions. The person whose name is "Watson" is not only one. The combination of the name "Watson" and the modification expressions which is "got Novel prize" and "with analysis of Molecular Structure of Nucleic Acids" specifies the person "Watson" who got Novel prize with analysis of Molecular Structure of Nucleic Acids. Each modification expression has a degree of specificity, and the degree of specificity of the combination of modification expressions and a person name is calculated with their specificities. And the anonymity setting processing unit gives anonymity to the modification expression of which specificity degree is greater than a predetermined threshold.

The specificity calculating unit includes a sentence extracting unit for decomposing an input document for a sentence, a part-of-speech analyzing unit for decomposing the extracted sentence for each part of speech, a person name extracting unit for extracting a name based on a name extracting rule from a result of the part-of-speech analysis, and a person name specificity calculating unit for calculating a specificity of the person name thus extracted based on statistical information. Furthermore, the specificity calculating unit further includes a syntax analyzing unit for creating a syntax tree indicative of a modification relationship between clauses based on a syntax analyzing rule from a result of a part-of-speech analysis, a person specifying tree extracting unit for extracting a tree structure which specifies a person. The tree structure is a modification expression from the result of the parsing unit, and a tree structure specificity calculating unit for calculating a specificity of the person specifying tree (modification expression) thus extracted based on statistical information. The specificity calculating unit includes following units.

(I) A sentence extracting unit for extracting a sentence from an input document (II) A part-of-speech analyzing unit for analyzing the extracted sentence for each part of speech (III) A person name extracting unit for extracting a person name based on a person name extracting rule from part-of-speech analyzed data (IV) A parsing unit for creating structure tree indicative a modification relationship between clauses related to a person name based on a parsing rule from the part-of-speech analyzed data (V) A person specifying tree extracting unit for fetching a person specifying tree as near expression based on a person specifying tree extracting rule for the structure tree obtained as a result of parsing (VI) A specificity calculating unit for calculating the degree of the specificity which combinations of a person name and modification expressions specify a person by the following method based on statistical information in a extracted document. The modification expressions modify the person name.

The modification expression is a tree structure having a modification relationship with a person name as a result of the parsing. For example, "X is the president of Y". "X" is the name of president, and "Y" is company. In the example sentence, "X" is a person name, and the modification expression is "the president of Y". The modification expression modify the person name "X". There is a relationship that "the president of Y" modifies "X". A person name or a modification expression which can specify a person is extracted from an input document.

The specificity calculating unit calculates a specificity from probabilities at which an extracted expression specifies a person. The probabilities are read from the standard specificity database 14, or calculated based on statistical information of a person name. The standard specificity database 14 stores probabilities of which the person name or the modification expression indicates person with indicated person ID. If an expression is a part of another expression, this expression is out of specificity calculation.

A person "p", and his specificity "K(p)" is calculated by following equation.

$$K(p)=(\text{Sum of probabilities at which expressions which is not pert of another specify } p) \quad \text{(eq-1)}$$

The method of calculating the specificity K(p) is not restricted to the above equation but it is also possible to use a calculating method having a property that the specificity increases when sum of probabilities increases. The database creating unit 15 extracts a document from a document database to be a group of existing documents through a document extracting unit, then decomposes the document into a sentence through a sentence extracting unit, extracts a person name and a modification expression through a part-of-speech analyzing unit, a person name processing unit and a modification expression processing unit, calculates a probability indicated a certain person, and stores reference specificity data having a set of an ID for identifying a person indicated by an expression, a type of an expression, an expression, and a probability at which an expression indicates a person. For the probability calculation, it is necessary to specify a person indicated by an expression. For this reason, an expression for specifying a person such as an electronic mail address and an address is used. These have the following features of an expression and are fetched from a document by utilizing the features of the expression.

(I) Electronic mail address: abcd@xxx.yyyy.com (II) Address: 1600 Pennsylvania Avenue NW Washington, D.C. 20500

These expressions specify certainly a person who has an identification ID. A person "p000" has a name and his name is modified by the modification expressions. A person "p000" and a his name "α", it is shown by "α→p000" that "α" indicates "p000". A probability "P(α→p000)" is indicating a degree which "α" specifies a person "p000". And by using a modification expression "β", it is shown by "β→p000" that "β" can specify "p000". A probability "P(β→p000)" is indicating a degree which "β" indicates a person "p000". "M" is an input document. "α" and "β" is extracted from "M", these probabilities are calculated in the following equation.

$$P(\alpha \rightarrow p000)=(\text{number of } \alpha \text{ in } M)/(\text{number of all person names in } M) \quad \text{(eq-2)}$$

$$P(\beta \rightarrow p000)=(\text{number of } \beta \text{ in } M)/(\text{number of all modification expressions in } M) \quad \text{(eq-3)}$$

The calculation method is not restricted to above equations but it is also possible to use a calculation method having a property that the probability increases when the number of "α" or "β" increases. The database creating unit 15 registers the probabilities from above equations to reference specificity database 14.

If an expression of an electrical mail address or an address is not in the input document, a probability of which a person name "α" indicate a person "px" who is not specified is calculated by following equation. In the following equation "N" is the number of the kind of person names in reference specificity database 14.

$$P(\alpha \rightarrow px)=(\text{number of a in } M)/N \quad \text{(eq-2')}$$

The probability at which a person is specified and read from the reference specificity database and a specificity is calculated through the specificity calculating unit. By comparing the specificity thus calculated with a reference value, it is decided whether or not an anonymity setting processing is to be carried out. The specificity calculating unit include a database creating unit for extracting a person name and a modification expression for each document from the existing document of a document database and calculating a specificity, and creating a reference specificity database storing specificity data having a set of an expression, a type of a person name or a modification expression and a probability of an expression specifying a person.

The anonymity setting device according to the present invention further comprises an anonymity setting indicating unit for setting and changing a threshold to be used for the anonymity setting processing unit. Therefore, a worker who conceal personal information in a document can easily adjust the degree of concealment with checking result of giving document anonymity by changing threshold. The anonymity setting unit retains a threshold which is used last work. Therefore, a worker can start a new work with the degree of last threshold. The anonymity setting processing unit has a non-anonymity setting requiring database registering a non-anonymity setting requiring notation and does not anonymity set an expression registered in the non-anonymity setting requiring database in the anonymity setting notation extracted from the input document. For example, public person such as a prime minister or an entertainer is registered in the non-anonymity setting database and is excluded from expression which is given anonymity. The anonymity setting processing unit has an anonymity setting database registering a letter pattern of a expression to be always given anonymity. The anonymity setting database registers following letter patterns I–IV.

Letter pattern: NNNN NNNN NNNN NNNN

This is a letter pattern of credit card number (I) Letter pattern: N+-N+-N+

Letter pattern: (N+)N+-N+

These are letter pattern of telephone number in Japan.

(II) Letter pattern: A+@A+.A+

Letter pattern: A+@A+.A+.A+

Letter pattern: A+@A+.A+.A+.A+

These are letter pattern of electric mail address.

(III) etc.

In these letter patterns "N", "A", "+" have next meaning.

A. "N" is numeric letter "0–9".

B. "A" is alphabetic letter "A–Z" or "a–z".

C. "+" is optional repetition of before letter.

The anonymity setting processing unit always sets anonymity for expressions with letter patterns which are registered in the anonymity setting database if the degree of specificity of expressions is under threshold. The anonymity setting processing unit can selectively carry out the following processing as the anonymity setting processing.

(I) An anonymity setting expression extracted from an input document is changed meaningless expressions.

(II) An anonymity setting expression extracted from an input document is replaced with a low specificity notation having a specificity equal to or lower than a threshold which is to be used for anonymity setting of the anonymity setting expression.

(III) A anonymity setting expression extracted from an input document is encrypted, thereby carrying out anonymity setting.

The decrypting unit is for decrypting the encrypting expressions and displaying the decrypted document. Someone can read decrypted document by password input.

Moreover, the present invention provides a document anonymity setting method. The method comprises a document input;

a specificity calculating of extracting expressions which is rewritten with anonymity expression from the input document and calculating a specificity to evaluate a degree of specificity at an extracted expression can specify a person; and an anonymity setting processing step of anonymity setting processing of rewriting expressions which have greater specificities than a predetermined threshold. The details of the document anonymity setting method are the same as those in the case of the structure of the device.

Furthermore, the present invention provides a computer readable recording medium recording an anonymity setting program. The anonymity setting program recorded in the recording medium causes a computer to execute following steps.

(I) A document input step of inputting a document (II) A extracting step of extracting a person name and modification expression which can specify a person from input document (III) A calculating step of a calculating a specificity to evaluate a degree of intensity at extracted expression which is a person name or a modification expression (IV) An anonymity setting processing step of rewrite from extracted expression to anonymity one when degree of specificity intensity of extracted expression is greater than a predetermined threshold.

The details of the anonymity setting program in the recording medium are also the same as those in the case of the structure of the device.

The above and other objects, features, and advantages of the present invention will become more apparent from the following detailed description with reference to the accompanying drawings.

BRIEF DESCRIPTION OF THE DRAWINGS

FIG. 8 is a diagram illustrating a reference specificity database;

FIG. 11 is a diagram illustrating a threshold database in FIGS. 1A and 1B;

FIGS. 12A and 12B are flow charts showing a replacement processing in FIG. 10;

DETAILED DESCRIPTION OF THE PREFERRED EMBODIMENT

Figure 1A:
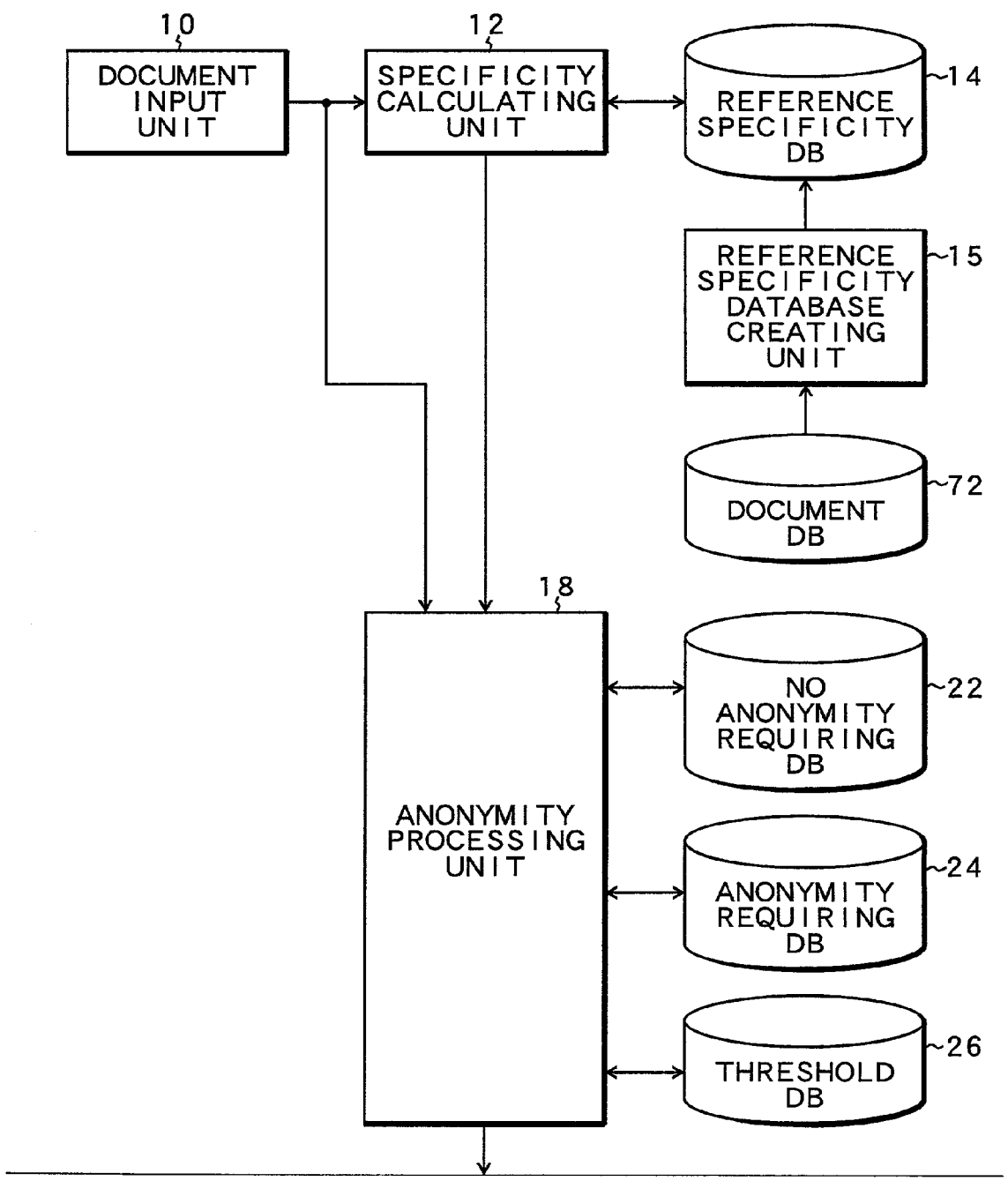
FIGS. 1A and 1B are block diagrams showing a functional structure according to the present invention.
Figure 1B:
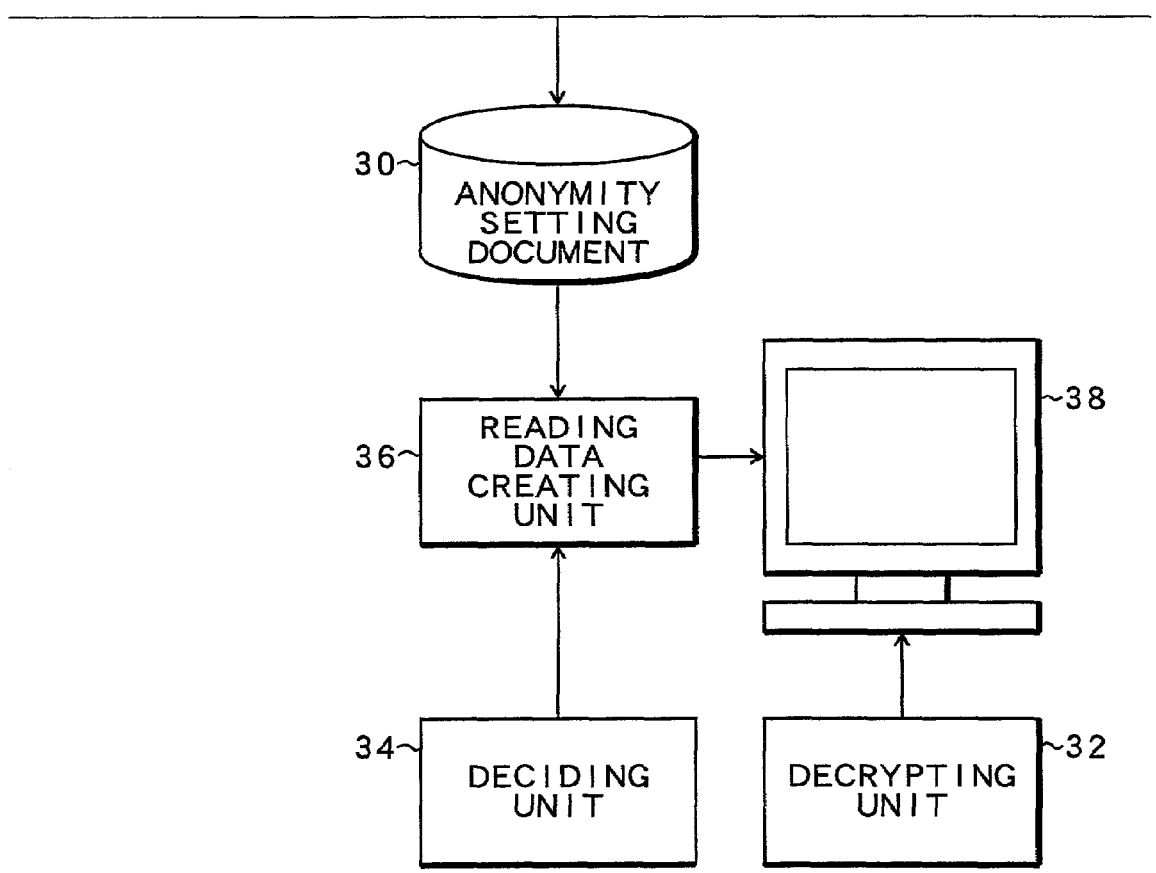

FIGS. 1A and 1B are a block diagram showing the functional structure of a document anonymity setting device according to the present invention, which are implemented by the program control of a computer device. The document anonymity setting device according to the present invention comprises a document input unit 10, a specificity calculating unit 12, a reference specificity database 14, an anonymity setting processing unit 18, a non-anonymity requiring database 22, an anonymity setting database 24, a threshold database 26, a display unit 38 and an anonymity setting document storage unit 30. Furthermore, a decoding indicating unit 32, a deciding unit 34, a reading data creating unit 36 and a display unit 38 are provided in order to read an anonymity setting document stored in the anonymity setting document storage unit 30 if necessary. Referring to the document anonymity setting device according to the present invention which has such a functional structure, each processing unit will be described below in detail. The document input unit 10 inputs a document which is rewritten with anonymity expression. An input document includes a document to analyze data, for example, and includes document information such as a questionnaire answer, a complaint and an electronic mail which are sent from a client, for example. The input document is inputted by the document input unit 10 is given to the specificity calculating unit 12 to calculate a specificity. The specificity is an expression to specify a person, that is, a value to evaluate the degree of intensity at which a person can be specified for a person name and a modification expression thereof. In the present invention, the specificity calculating unit 12 extracts a person name and a modification expression from an input document, calculates a probability at which the person name and modification expression thus extracted indicate a person from the document database 72 based on the equations (eq-2, eq-3) and (eq-2') or reads a probability at which the expression indicates a person from the reference specificity database. A specificity is calculated from these probability, and the anonymity setting state unit 18 conceals a person name and a modification expression which have a greater specificity than a predetermined threshold. As following description, database creating unit 15 calculates a specificity which an expression specifies a person by using equations (eq-2) and (eq-3) from a document in the document database 72. In document database 72 includes documents of which quantity is enough to calculate standard specificity. Data having a set of following four items shown in FIG. 8 are output from the reference specificity database 14:

(I) Personal identification ID of a person
(II) Type of expression
(III) Expression
(IV) Probability at a expression specifying a person The specificity calculating unit 12 calculates a specificity based on the equation (eq-1) from the output of the reference specificity database 14.

Description will be given in accordance with an example of the reference specificity database 14 shown in FIG. 9. In this example, it is assumed that N to be used in the equation (1) is 4. The following expressions which are extracted from the input document specify a person P001.

(I) John
(II) John Smith
(III) j_smith@someone.company.com
(IV) In Information Apparatus sales division But "John" is a part of "John Smith", probability of "John" is omitted. A specificity of P001 is calculated from the equation (eq-1).

0.9+1.0+0.2=2.1

Referring to P003, only a person name of "John" is extracted from input document, and specificity of the expression "John" is calculated as same as P001.

0.2=0.2

If 2.1 for P001 is the maximum in specificities calculated for all the person in reference database, it is decided whether or not concealment is to be carried out by comparing 2.1 with a predetermined threshold. The specificity calculating unit 12 outputs, to the anonymity setting processing unit 18, a set of specificity data of:

(I) An expression
(II) A specificity value
(III) A position of an expression in an input document.

The anonymity setting processing unit 18 uses the specificity data output from the specificity calculating unit 12, thereby carrying out an anonymity setting processing of concealing a person name and a modification expression for the input document obtained from the document input unit 10. The following three indicating values are given by a user by using an input device such as a keyboard or mouse to the anonymity setting processing unit 18.

(I) threshold
(II) anonymity setting method

The threshold is set by a user is compared with the specificity of the specificity data obtained from the specificity calculating unit 12 and the anonymity setting processing of concealing a person name and an modification expression having a specificity which is equal to or greater than the threshold is carried out. Examples of a method of setting a threshold include a proper visual operation such as a method of operating a slide bar indicating a specificity value by a mouse or a method of opening a threshold setting window on a display unit to select a threshold from a window item as well as a method of directly inputting a numeric value of the threshold. The anonymity setting processing unit 18 includes the following anonymity setting methods.

(I) rewriting to meaningless letters
(II) rewriting to low specificity expression
(III) rewriting to encrypted expression Referring to the turned letter setting, first of all, a mark using, for the turned letter, a name and a modification expression which are rewritten anonymity expression is selected and all the expressions objects are replaced with the selected letters. For example, a name of "George Washington" is set to "XX". For the rewriting rule, the following is described, for example.

Rule 1: A name of a person is replaced with "A".
Rule 2: A name of a company is replaced with "A".

Referring to rewriting to the low specificity expressions, an extracted expression is replaced with a expression having a lower specificity. For the rewriting to low specificity expressions, a set of a name of a person and a specificity and a set of a person specifying tree and a specificity which have low specificities are retrieved from the reference specificity database 14. At this time, the expression having a lower specificity than a specificity of an extracted expression is used to rewrite with the anonymity expression. More specifically, in the case of a name of a person, a person name of a person having a low specificity is retrieved from the reference specificity database 14 to replace a person name. In the case of modification expression, the modification expressions of which specificity are smaller than threshold is retrieved from reference specificity database 14. The input document is rewritten with the retrieved modification expressions. If the retrieve of modification expression is failure, failure of retrieve is noticed. Referring to the rewriting to encrypted expression, furthermore, the expression is encrypted in accordance with a predetermined encrypted rule. For the anonymity setting processing unit 18, a non-anonymity requiring database 22 and an anonymity requiring database 24 are provided. The expressions and a letter pattern which are recorded to the non-anonymity requiring database 22 are not rewritten. And the expressions and a letter pattern which are recorded to the anonymity requiring database 24 are rewritten with anonymity expressions. An expression specifying a person and a letter patterns for identification are registered in the non-anonymity requiring database 22. For example, the following is registered in the non-anonymity requiring database 22.

(I) Name of a public person such as a prime minister or a minister
(II) Name of an entertainer
(III) Letter pattern for specifying a person having a modification expression specifying of a public man such as a prime minister or a states man.

For example, the anonymity setting database 24 registers the following expressions and letter patterns.

(I) Letter pattern: NNNN NNNN NNNN NNNN
This is a letter pattern of credit card number
Letter pattern: N+-N+-N+
Letter pattern: (N+)N+-N+
These are letter pattern of telephone number in Japan.
(II) Letter pattern: A+@A+.A+
Letter pattern: A+@A+.A+.A+
Letter pattern: A+@A+.A+.A+.A+
These are letter pattern of electric mail address.

(III) etc.

In these letter patterns "N", "A", "+" have next meaning.
A. "N" is numeric letter "0–9".
B. "A" is alphabetic letter "A–Z" or "a–z".
C. "+" is optional repetition of before letter.

The anonymity setting document is rewritten by the anonymity setting processing unit 18 is stored in the anonymity setting document storage unit 30. The anonymity setting document storage unit 30 stores document ID and the anonymity setting document, anonymity setting processing information includes a threshold and anonymity setting method. The threshold and the anonymity setting method which are obtained by an anonymity setting document record stored in the anonymity setting document storage unit 30 are registered in the threshold database 26 based on a document identification. The threshold and anonymity setting method before process can use repeatedly. The document rewritten with anonymity expression is stored in the anonymity setting document storage unit 30. The reading data creating unit 36 read the rewritten document from the anonymity setting document storage unit 30, and generates display data on display unit 38.

The decrypting unit 32 decrypts the encrypted expressions by password input. After the decryption, expressions can be read on the display unit 38.

Figure 2:
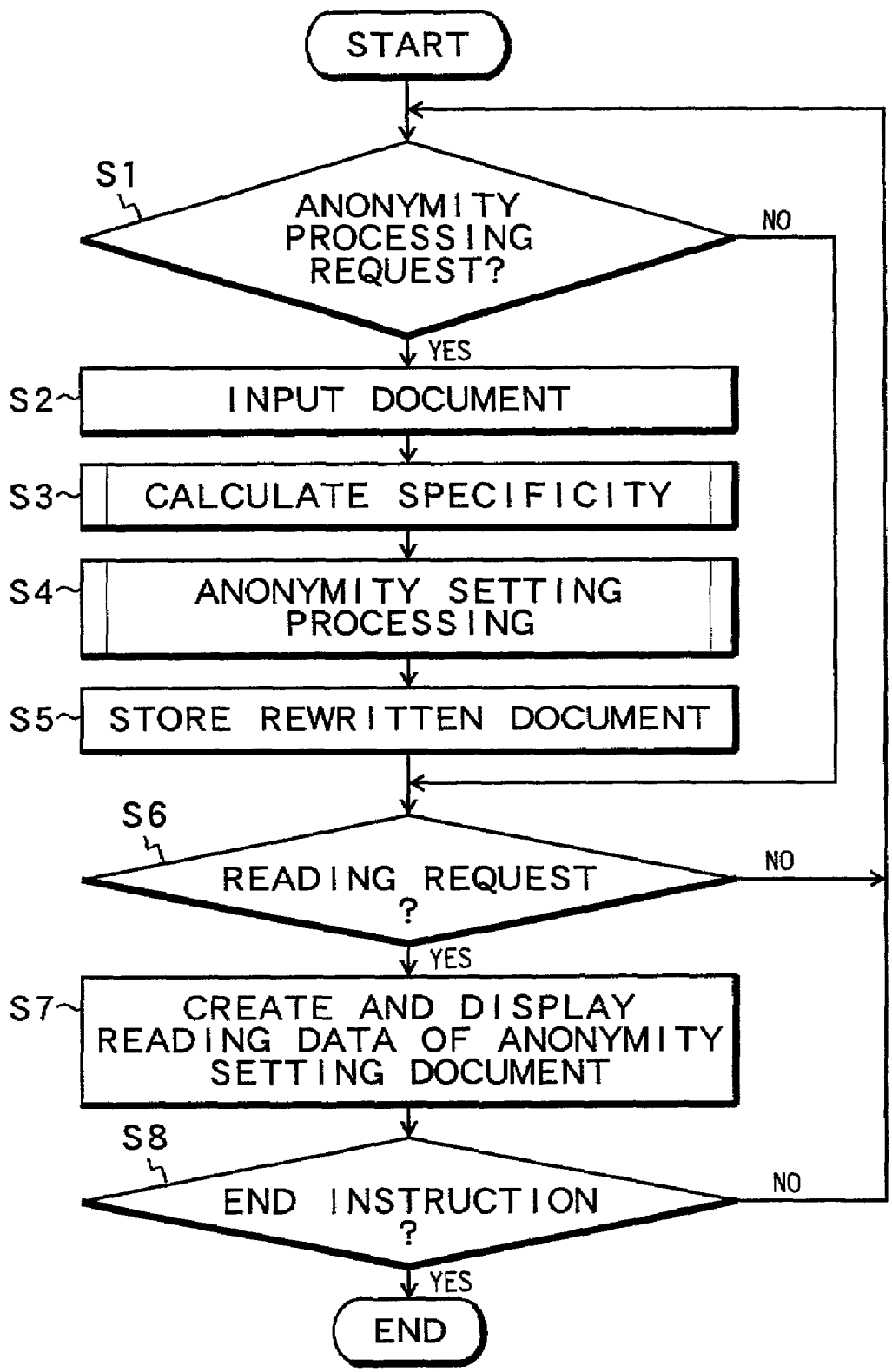
FIG. 2 is a flow chart showing a document anonymity setting processing according to the present invention.

FIG. 2 is a flow chart showing a document anonymity setting processing according to the present invention in FIGS. 1A and 1B. At Step S1, the presence of a rewriting an expressions needed whether is checked. If the anonymity setting processing request is decided by the user, the processing proceeds to Step S2 where an anonymity setting object document is input through the document input unit 10. At step S3, subsequently, a specificity is calculated for the expression is a person name or modification expression by the specificity calculating unit 12. A probability of person name or modification expression is read from the standard specificity database 14. At Step S4, subsequently, the anonymity setting processing is carried out based on the specificity. When the anonymity setting processing is completed at the Step S4, an anonymity setting document is stored in the anonymity setting document storage unit 30 at Step S5. At Step S6, thereafter, a reading request is checked. If there is the reading request, the processing proceeds to Step S7 where the reading data of the retained anonymity setting document are created and displayed. If there is an instruction for end at Step S8, a series of processings are ended.

Figure 3:
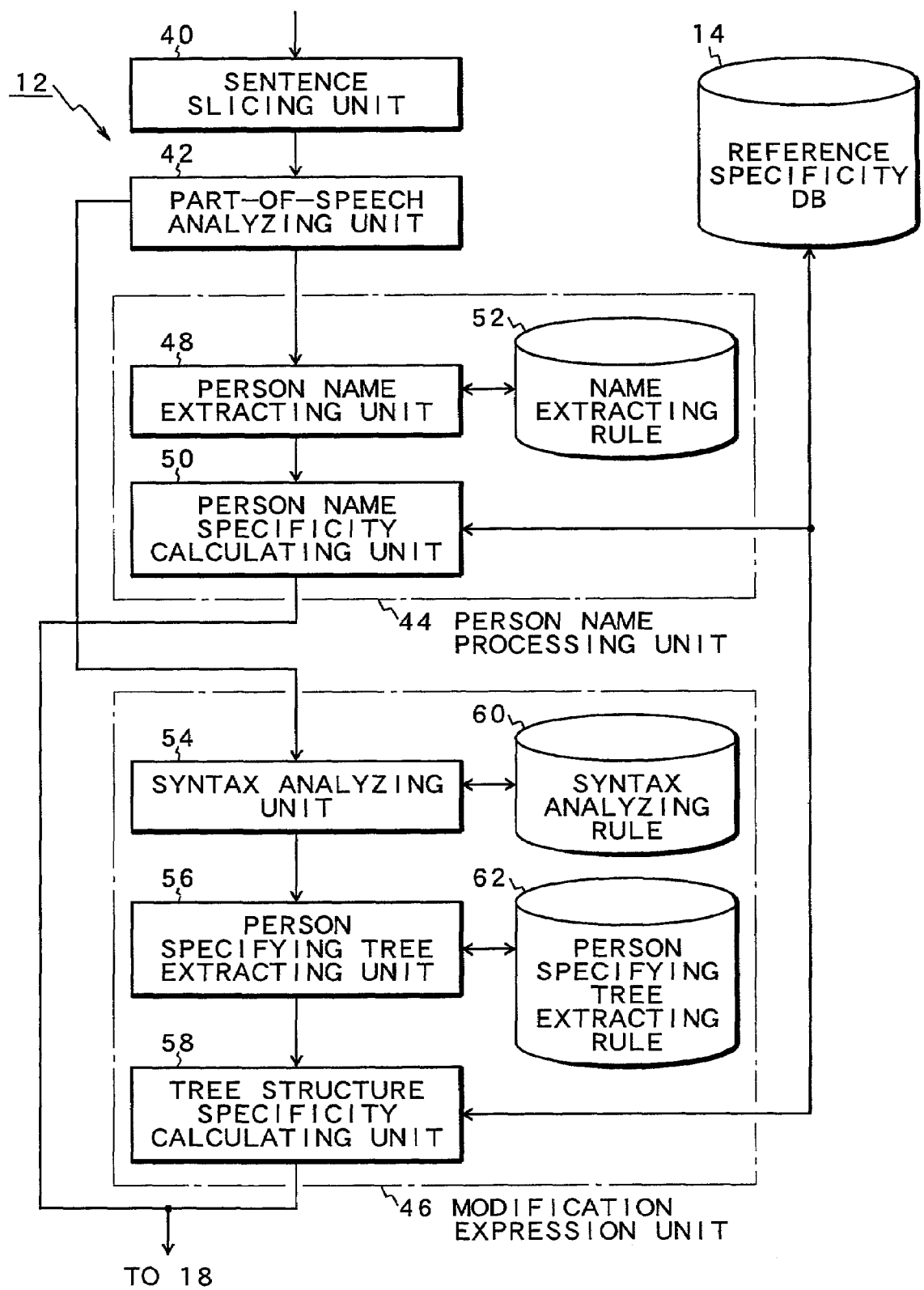
FIG. 3 is a block diagram showing the functional structure of a specificity calculating unit illustrated in FIGS. 1A and 1B.

FIG. 3 is a block diagram showing a functional structure showing the details of the specificity calculating unit 12 in FIGS. 1A and 1B. The specificity calculating unit 12 includes a sentence extracting unit 40, a part-of-speech analyzing unit 42, a person name processing unit 44 and a modification expression unit 46. The person name processing unit 44 is provided with a person name extracting unit 48, a person name specificity calculating unit 50 and a person name extracting rule 52. Moreover, the modification expression unit 46 includes syntax analysis unit 56, a modification expression extracting unit, modification expression specificity calculating unit 58, a syntax analysis rule 60, and a modification expression extracting rule 62. The anonymity setting document input from the document input unit 10 shown in FIG. 2 is given to the sentence extracting unit 40 in the specificity calculating unit 12 in FIG. 3 and a extracted a unit of sentence is input to the part-of-speech analyzing unit 42. The part-of-speech analyzing unit 42 gives words the part-of-speeches and outputs series of combination of the words and their part-of-speeches to person name processing unit 44 and modification expression unit 46 respectively to carry out. The person name extracting unit 48 receiving the series of the combination of words and its part-of-speech from the part-of-speech analyzing unit 42 extracts a person name by using the person name extracting rule 52 and outputs the person name to the person name specificity calculating unit 50. The person name extracting rules 52, the following if-then rule. In the condition unit of if-then rule, "[ ]" is part-of-speech.

Rule 52-1: if [first-name] [middle-name] [family-name] then extract as a name

Rule 52-2: if [first-name] [family-name] then extract as a name

Rule 52-3: if [first-name] then extract as a name

Rule 52-4: if [family-name] then extract as a name

According to such rules 1–4 of rules 52 the person name extracting rules 52, a person name is extract as a word string having a part-of-speech pattern. Moreover, a person name of is extracted from a part-of-speech of family name according to the rule 2. Furthermore, a person name is extracted from a part-of-speech of first name according to the rule 4.

For example, a person name is "John F. Kennedy". From part-of-speech analyze, part-of-speech of "John" is first-name, part-of-speech of "F." is middle-name and part-of-speech of "Kennedy" is family-name. This name is extracted by rule 1.

The syntax analyzing unit 54 of the modification expression unit 56 creates a tree structure indicative the modification relationship between expressions, that is, part-of-speech analyzing for the sentence decomposed for each part-of-speech obtained from part-of-speech analyzing unit 42. At this time, the parsing unit 56 uses the parsing rules 60. The following rules are registered according to if-then rule. In the condition unit, a part-of-speech is represented by [ ]. In the execution unit a part-of-speech is represented by [ ], the relationship between parts of speech is described with "( )", and the name of relationship is described with "< >".

Rule 60-1: if [person name] [verb] [noun phrase] then [person name] ([noun phrase]→<modification>→[person name])

Rule 60-2: if [person name noun phrase] [verb] [noun phrase] then [person name] ([person name noun phrase]→<modification>→[person name noun phrase])

For example, "The founder X is the president of Y". (X is a person name, Y is a company)

From the rule of 60-1, "X" is [first name], "is" is [verb], and "the president of Y" is [noun phrase]. And following relationship is generated.

[noun phrase]→<modification>→[person name]

This relationship is that noun phrase modifies person name. In this case accordingly a tree structure shown in FIG. 4 is obtained.

Figure 4:
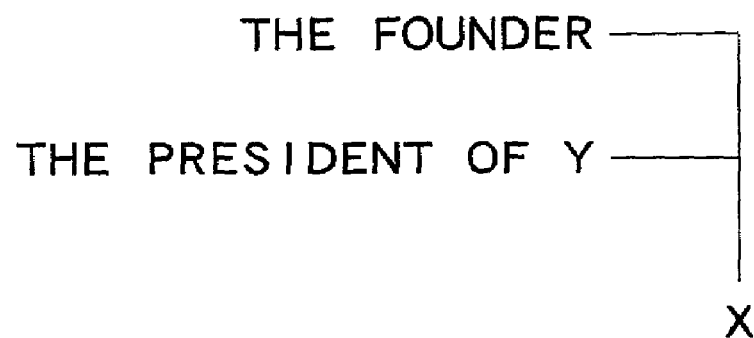
FIG. 4 is a diagram illustrating a syntax tress of a modification expression obtained by a syntax analysis.

For structure tree obtained as shown in FIG. 4, the following person specifying tree extracting rule 62 to extract a unit part tree. The person specifying tree extracting rule registers the following rule.

Figure 5:
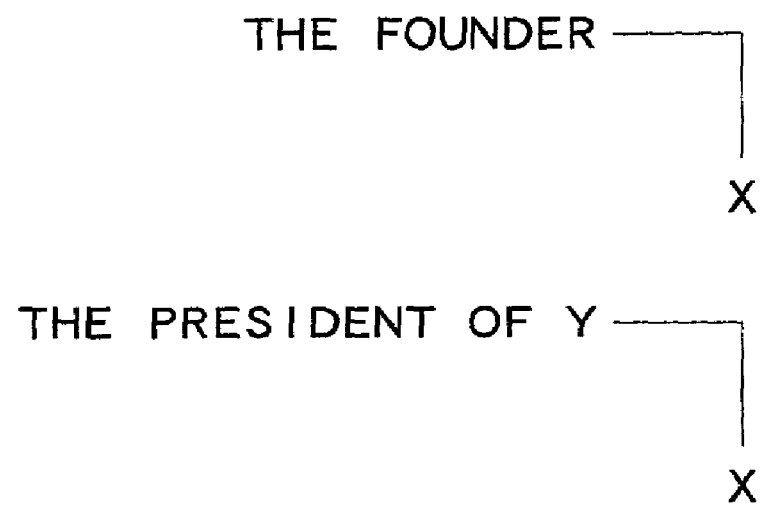
FIG. 5 is a diagram illustrating a person specifying tree extracted from the syntax tree shown in FIG. 4.

Rule 62-1: if [noun phrase]→<modification>→[person name] then extract as a person specifying tree Rule 62-2: if [noun phrase]→<modification>→[person name noun phrase] then extract as a person specifying tree In other words, the rule 62-1 corresponds to extraction of noun phrase modifying a person name or the like as person specifying tree. For example, it is possible to extract, as a person specifying tree, "The president of Y"→<modification>→"X" from a tree structure in which the "The president of Y" modifies "X". In this example, the tree structure shown in FIG. 5 is extracted as the person specifying tree. Extracted person specifying tree is outputted the unit part tree to the tree structure specificity calculating unit 58.

The tree structure specificity calculating unit 58 refers to the standard specificity database 14 at calculating a specificity of extracted person specifying tree. Thereby acquiring a probability at which structure specifies a person and calculating a specificity in the same manner as the person name specificity calculating unit 50. The tree structure specificity calculating unit 58 calculates a specificity of extracted person specifying tree from a flow chart shown in FIG. 6.

Figure 6:
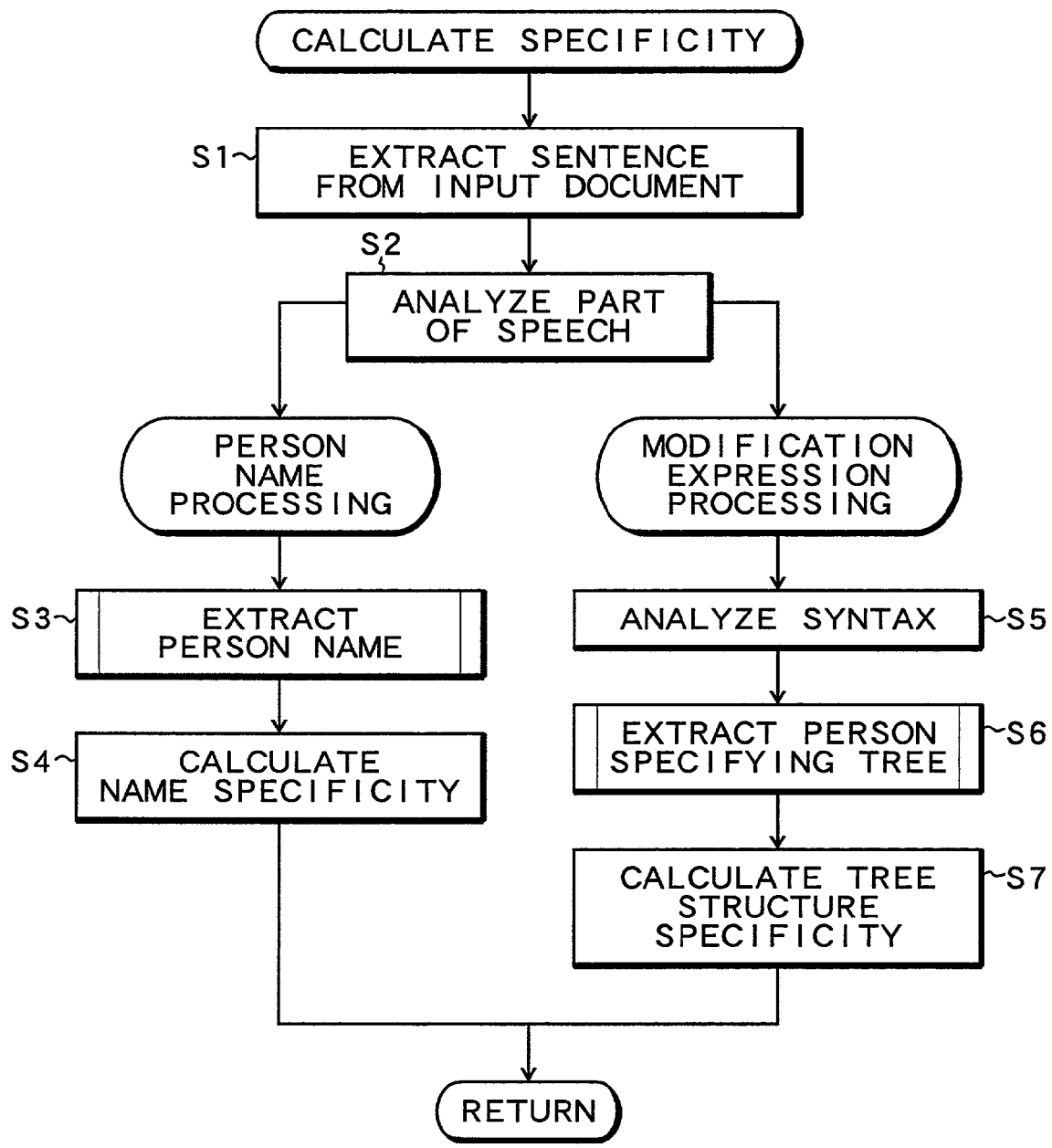
FIG. 6 is a flow chart showing a specificity calculation processing illustrated in FIG. 3.

FIG. 6 is a flow chart showing a processing in the specificity calculating unit 12 illustrated in FIG. 3. In the specificity calculation processing, a sentence is extracted of an input document at Step S1 and a part-of-speech analysis for decomposition into a part of speech is carried out and the part of speech is supplied to each of a person name processing and a modification expression processing at Step S2. In the person name processing, a person name is extracted at Step S3 and a person name specificity is calculated and is output together with a specificity obtained with reference to the reference specificity database 14 at Step S4. In the modification expression processing, moreover, a syntax analysis is carried out at Step S5, the person specifying tree extraction processing is then carried out at Step S6 and a tree structure specificity calculation is carried out with the reference specificity database 14 and is output to a normalization processing at Step S7.

Figure 7:
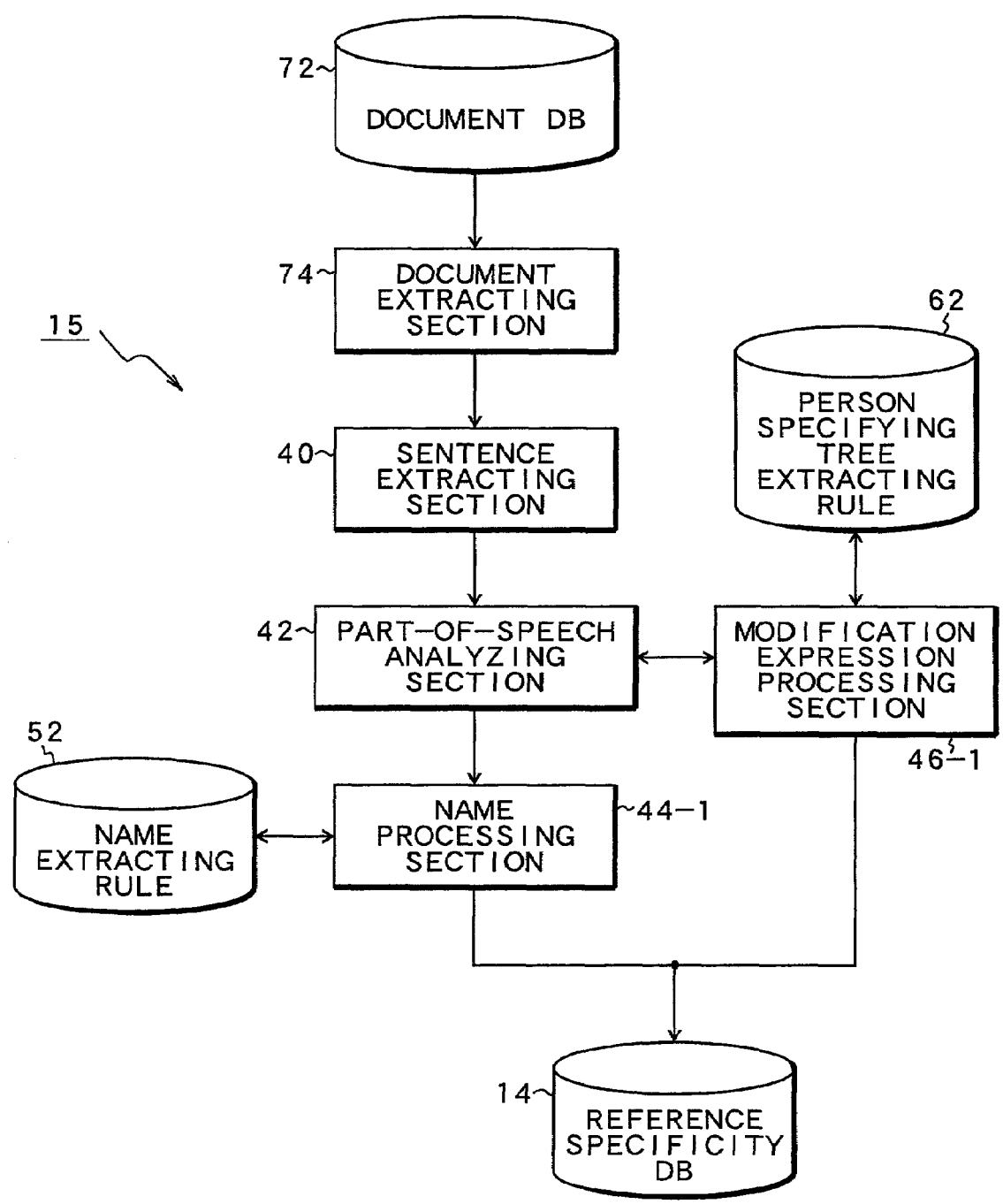
FIG. 7 is a block diagram showing the functional structure of a database creating unit provided in the specificity calculating unit illustrated in FIGS. 1A and 1B.

FIG. 7 shows the function of the database creating unit 15 provided in the specificity calculating unit 12 of FIGS. 1A and 1B. The database creating unit 15 creates the standard specificity database 14 from the document database 72. The document database 72 has enough quantity of documents to calculate standard specificity. In the database creating unit 15, therefore, the sentence extracting unit 40 for extracting the document from the document database 72 is provided and the extracted document is given to the sentence extracting unit 40. The sentence extracting unit 40 and the part-of-speech analyzing unit 42 in the database creating unit 15 which are to be used are the same as those in the block of the specificity calculating unit 12 in FIG. 3. A modification expression processing unit 46-1 extracts an electronic mail address, an address or the like which is a modification expression specifying a person and replace the same address with a person identification ID. The electronic mail address or the address has the following expression features and is fetched from a text by using the expression.

Electronic mail address: abcd@xxx.yyyy.com

Address: 1600 Pennsylvania Avenue NW Washington, D.C. 20500

In a person name processing unit 44-1 and the modification expression processing unit 46-1, a person name and a modification expression are extracted with the same mechanisms as the person name processing unit 44 and the modification expression processing unit 46 in FIG. 3. Referring to the person name and modification expression thus extracted, a probability at which the name and the modification expression indicate a person is calculated in accordance with the equations (eq-2, eq-3) and (eq-2'). Specificity data to have a set of a personal identification ID, a type of an expression, an expression and a probability at which an expression indicates a person which are created by the person name processing unit 44-1 and the modification expression processing unit 46-1 are registered as the reference specificity data in the reference specificity database 14 as shown in FIG. 8, for example.

Figure 9:
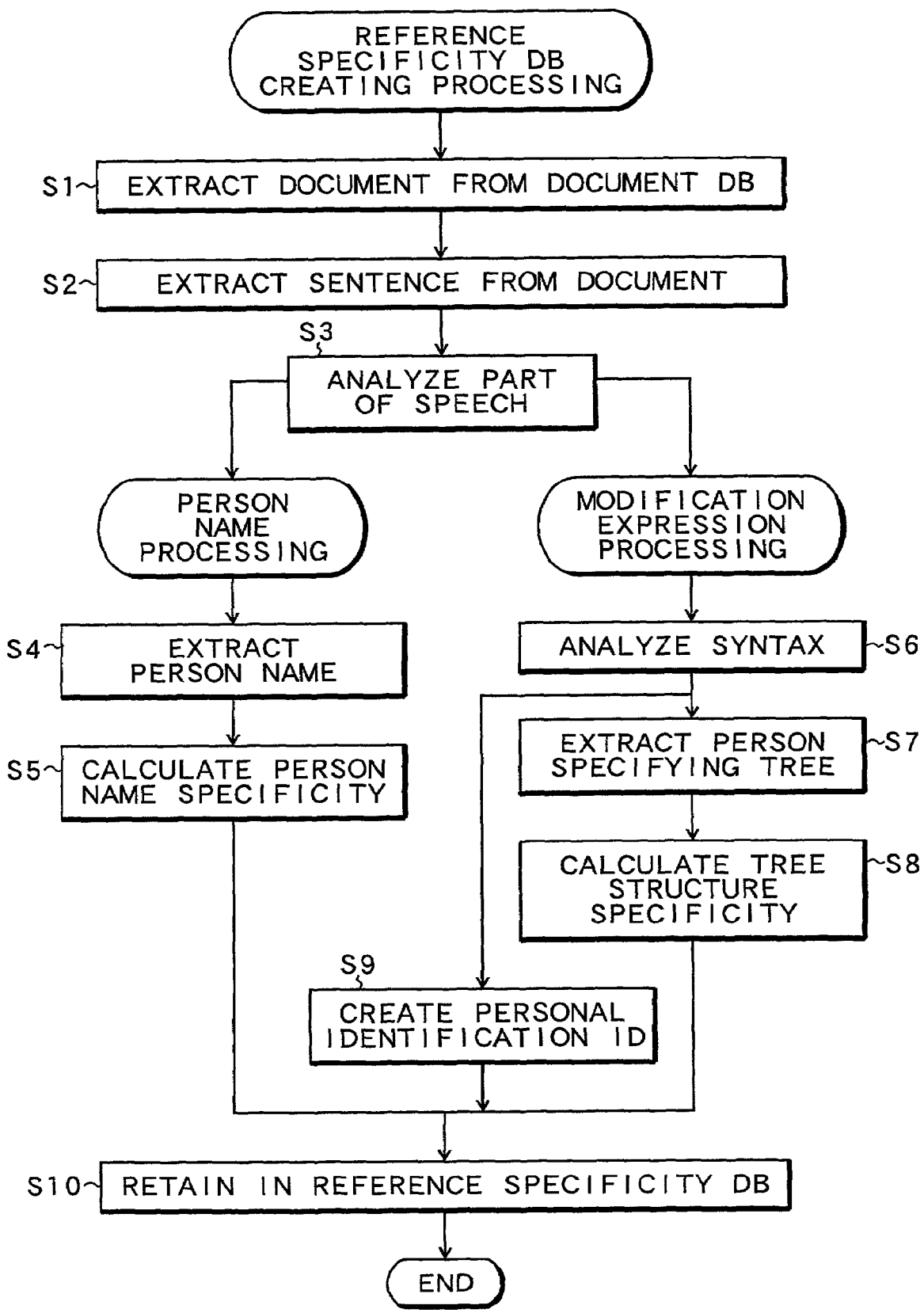
FIG. 9 is a flow chart showing a reference specificity database creation processing in FIG. 7.

FIG. 9 shows a flow of the processing of the database creating unit 15. The specificity calculating unit shown in FIG. 4, a document is extracted the document database 72 collecting existing documents and is decomposed into a sentence to fetch a person specifying tree to be a name and a modification expression. A personal identification ID is created based on a decision from the features of a notation such as an electronic mail address or an address which specifies a person in the modification expression and a probability at which the person name and the modification expression indicate a person is calculated for each personal identification ID based on the equation (eq-2, eq-3) or (eq-2') and is registered as the set of four data shown in FIG. 8 in the reference specificity database. FIG. 8 shows an example of the registered contents of the reference specificity database 14 in which the reference specificity data are registered the type, the expression and the probability.

FIG. 9 is a flow chart showing the processing of the reference specificity database creating unit 15 in FIG. 7. In the processing of creating a reference specificity database, a document is extracted the document database 72 to create a document at Step S1 and a part-of-speech analysis for decomposition for each part of speech is carried out at Step S3. The result of the part-of-speech analysis is given to a name processing at Steps S4 and S5 and a modification expression processing at Steps S6 to S9 respectively, and a name extraction, a name specificity calculation, a syntax analysis, a tree structure specificity based on a person specifying tree extraction, and a personal identification ID creation are carried out independently. At Step S10, finally, reference specificity data are registered in the reference specificity database 14 as shown in FIG. 8. The processing of creating a reference specificity database is basically carried out in a preparation stage before the anonymity setting device according to the present invention is used. Also during use, it is desirable that the document database 72 should be properly updated if necessary and the reference specificity database 14 should be rebuilt for new document data.

Figure 10:
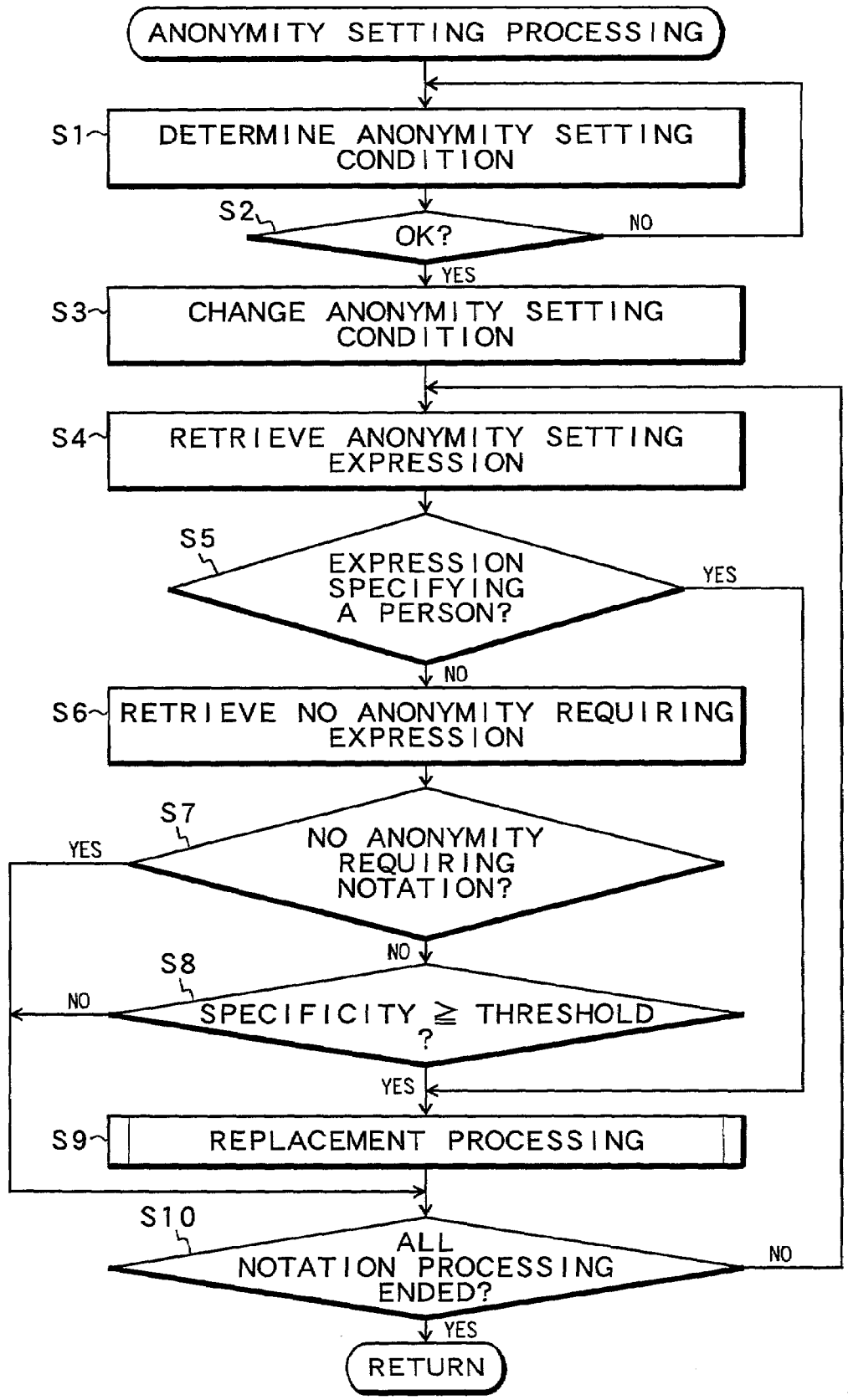
FIG. 10 is a flow chart showing an anonymity setting processing according to the present invention.

FIG. 10 is a flow chart showing the details of the anonymity setting processing at the Step S5 in FIG. 2. In the anonymity setting processing, anonymity setting condition to be used in the anonymity setting processing unit 18 is determined based on an instruction sent from the anonymity setting indicating unit 20 at Step S1. The anonymity setting processing is carried out based on the threshold database 26 when an instruction is not by user.

FIG. 11 shows the registered contents of the threshold database 26 in FIGS. 1A and 1B. The anonymity setting method is set at Step S2, or the method the last process is used at Step S3. At Step S4, a person name and a modification expression which indicates a person are retrieved for the anonymity setting object document. If there is an anonymity setting notation at Step S5, a non-anonymity setting requiring expression is retrieved with reference to the non-anonymity setting requiring database 22 at Step S6. If the expression is non-anonymity setting requiring expression at Step S7, subsequent processings are skipped. If the expression is not the non-anonymity setting requiring expression, a specificity obtained for the anonymity requiring expression is compared with the threshold set to be the anonymity setting condition at Step S8. If the specificity is equal to or greater than the threshold, a replacement with an anonymity expression at Step S9 is carried out. Any of the rewriting to meaningless expression, the generalization, the low specificity expression and the encoding is carried out for the replacement processing. At step S10, it is decided whether or not the anonymity requiring expression is completely retrieved. If the anonymity setting notation retrieval is not completed, the processing returns to the Step S4 again where the same processing is repeated. If the anonymity setting notation processing is wholly completed, a series of processings are ended.

Figure 12B:
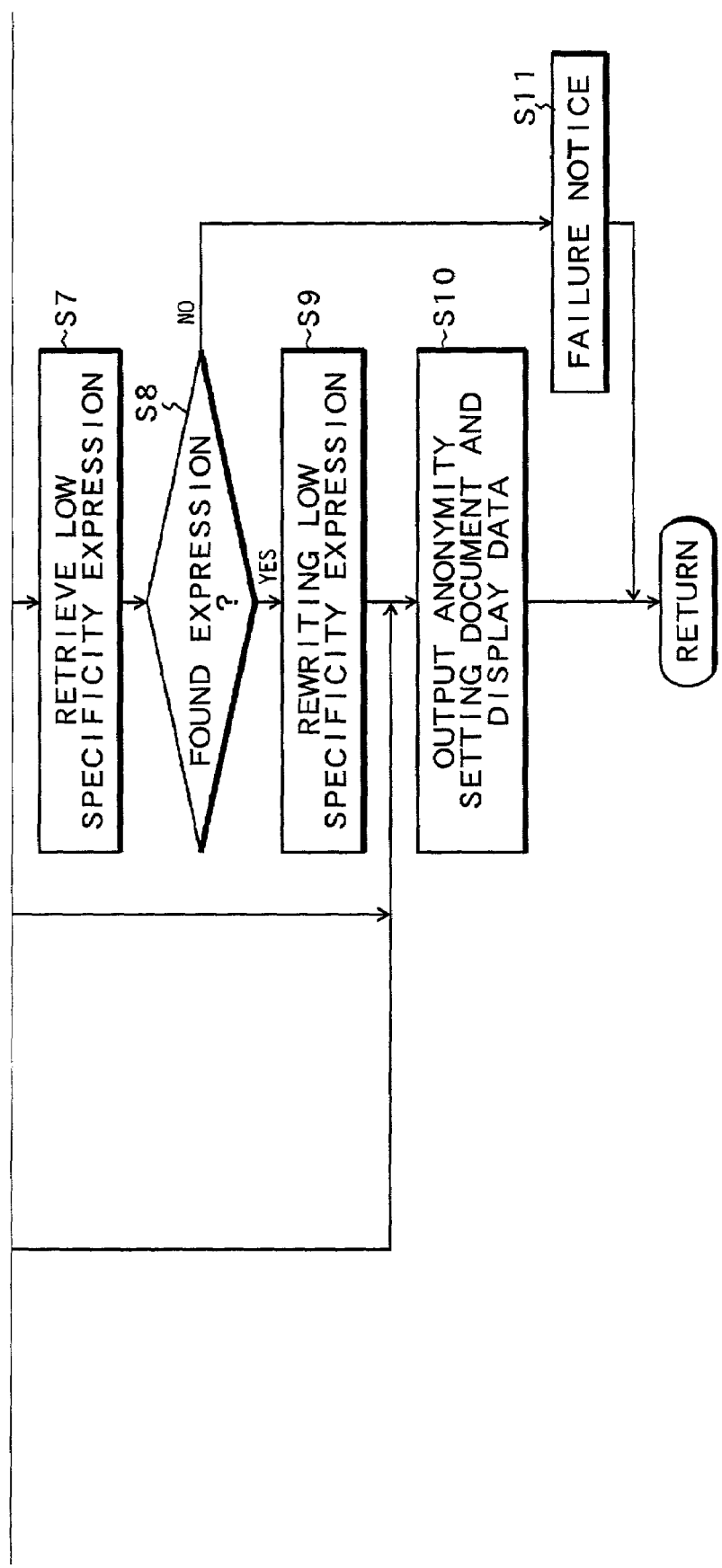

FIGS. 12A and 12B are flow charts showing the details of the replacement processing in the Step S9 of FIG. 10. First of all, the presence of an instruction for the rewriting to meaningless expression is checked as the anonymity setting condition at Step S1. If there is the instruction for the rewriting to meaningless expression, the processing proceeds to Step S2 where a mark to be used for a prepared rewriting meaningless expression is selected. At Step S3, the replacement with a rewriting is carried out for an expression having a specificity which is equal to or greater than the threshold. Moreover, if it is decided that an instruction for rewriting to low anonymity setting is sent as the anonymity setting condition at Step S7, the processing proceeds to Step S10. A person specifying tree to be a name or a modification expression which has a specificity smaller than the reference specificity database 14 is retrieved at the Step S10. If there is a rewriting to low specificity expression for the database retrieval at Step S11, replacement with the retrieved specificity notation is carried out at Step S12. On the other hand, in the case in which the low specificity expression cannot be retrieved from the database at the Step S11, a notice of a failure is given to the worker at Step S14 and the processing is then ended. Furthermore, the processing proceeds to Step S8 for encrypting and an encrypted expression is generated, and the expression is replaced with the encrypted expression at Step S9. When the replacement is completed at the Step S3, S6, S9 or S12, an input document and notation data are output at Step S13. The anonymity setting condition is set again if necessary to repeat the anonymity setting processing. If no more expressions, a rewritten document is stored in the anonymity setting document storage unit 30. The anonymity setting processing using decoding at the Steps S8 and S9 will be described below. For the replacement based on the encrypted expression, for example, code <CRYPT> indicating that the encoding is completed is buried in a start position at a place where the anonymity setting is carried out by the encoding and a code </CRYPT> indicating that the range of the encoding is completed is buried in an end position. Moreover, a decoding method is described by using a unit part of a start code <CRYPT> as <CRYPT METHOD="decoding method">. For example, an anonymity is set to "X analyzed a program" "X" is a person name through the encoding in the following manner. "<CRYPT METHOD="METHOD1">%abc$12DE;KsrBX</CRYPT> analyzed a program".

Referring to such encoding, in the case in which the result obtained by encrypting "X" of the input document is "%abc$12DE;KSrBX" and the decrypting method is "METHOD1", an expression "X" decrypting is replaced with an encrypted expression. In this example, a password and a public range are specified in the decoding method designated as "METHOD1", and a name of "X" cannot be read without the decrypting. Referring to the rewritten document obtained by the replacement processing using the encrypting, an instruction sent from the decrypting indicating unit 32 using decrypting method determined corresponding to the encrypting method and the decrypting method is given to the deciding unit 34 as shown in the decrypting unit 32, the deciding unit 34 and the reading data creating unit 36 in FIGS. 1A and 1B. Consequently, the input document replaced with the encrypted expression stored in the anonymity setting document storage unit 30 can be read by the decrypting method and a unit part for the encrypted expression can be decrypted into an original person name and modification expression which can be seen through the reading display unit 38.

Figure 13:
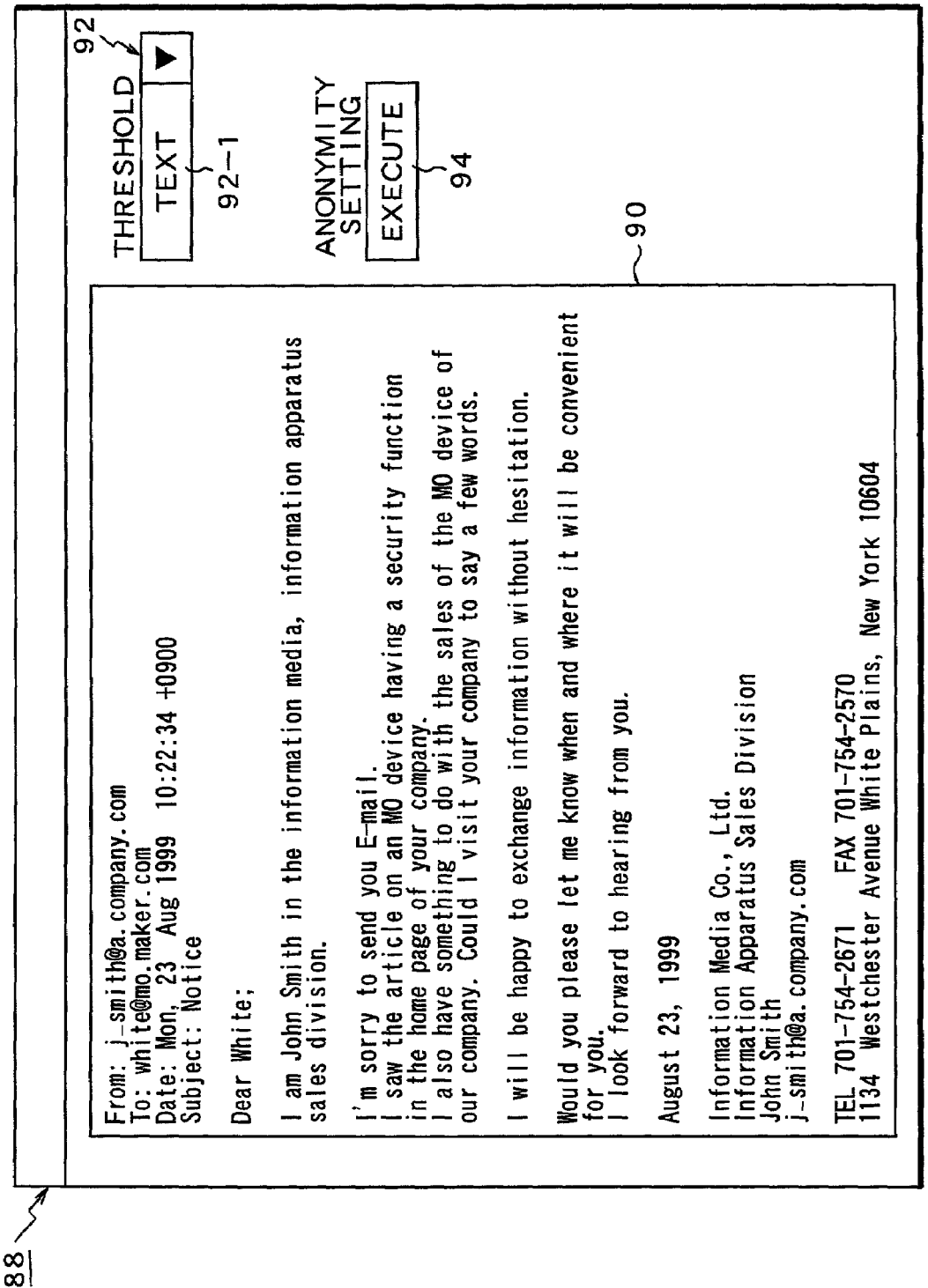
FIG. 13 is a diagram illustrating a text working screen to be processed according to the present invention.
Figure 14:
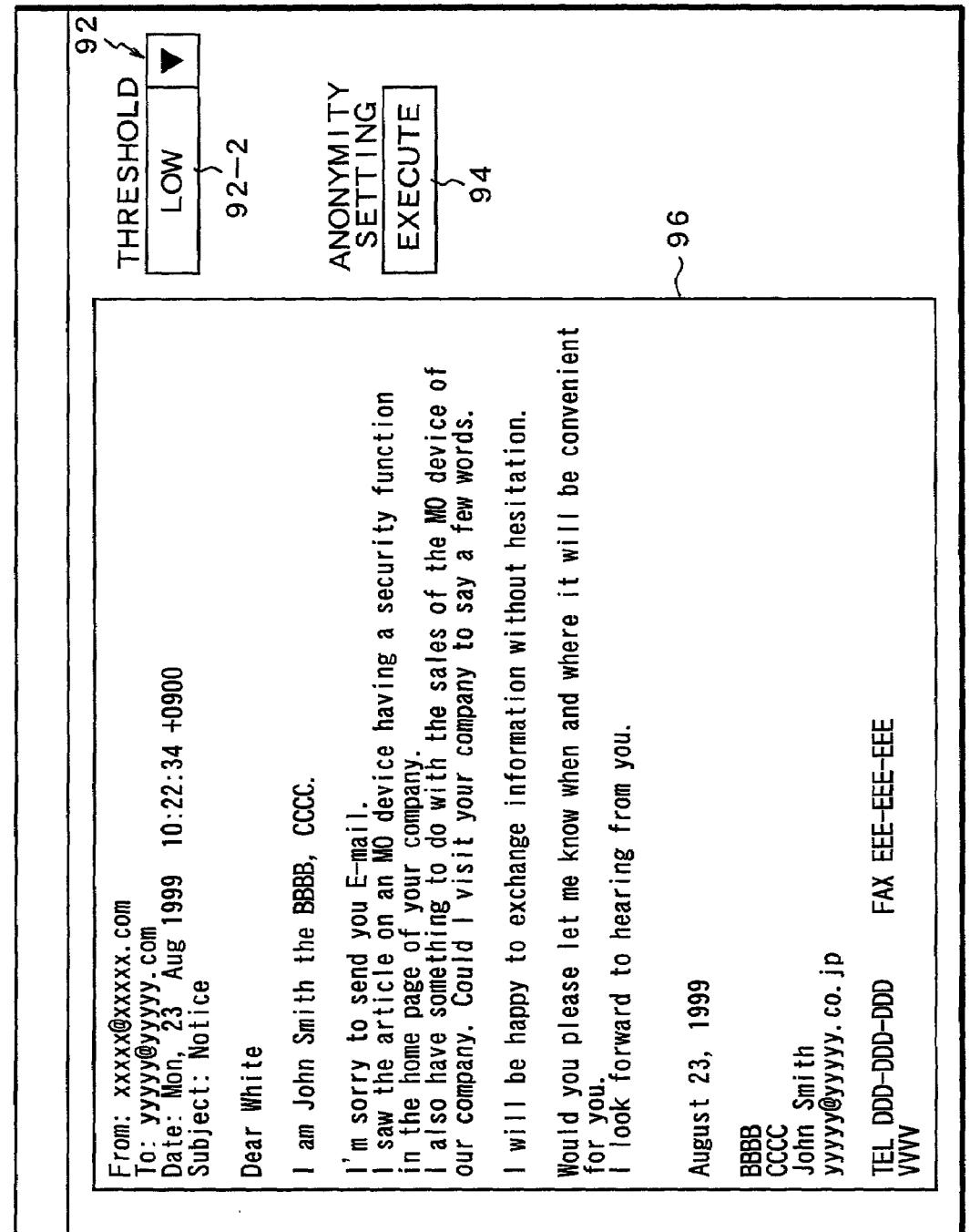
FIG. 14 is a illustrating the screen of a document is rewritten with anonymity expressions according to the present invention. In the case of FIG. 14, a part of expressions specifying a person are rewritten to anonymity expressions is indicated.

FIG. 13 is an anonymity setting window 88 displayed on the working display unit 28 shown in FIGS. 1A and 1B, in which an electronic mail 90 is displayed as an input document is inputted from the document input unit 10. A window 92 for setting the anonymity setting condition is provided on the right side of the anonymity setting working screen 88. It is indicated that a text 92-1 is displayed by opening the window 92. Referring to the working screen 88 for such a text, the window 92 is opened as shown in FIG. 14 to indicate the threshold 92-2 as a threshold based on the selected contents. When an execution key 94 is mouse clicked in this state, the document anonymity setting processing according to the present invention having a predetermined threshold is executed and an rewritten document 96 is displayed. In comparison of the anonymity setting document 96 with the electronic mail 90 to be a text in FIG. 13, the name of a company "Information Media Co., Ltd." and the name of a position "information media apparatus" are replaced with "BBBB" and "XXXX", respectively. Moreover, a mail address, a telephone number, a fax number and an address in the electronic mail 90 of the text are replaced based on an anonymity setting expression, respectively.

Figure 15:
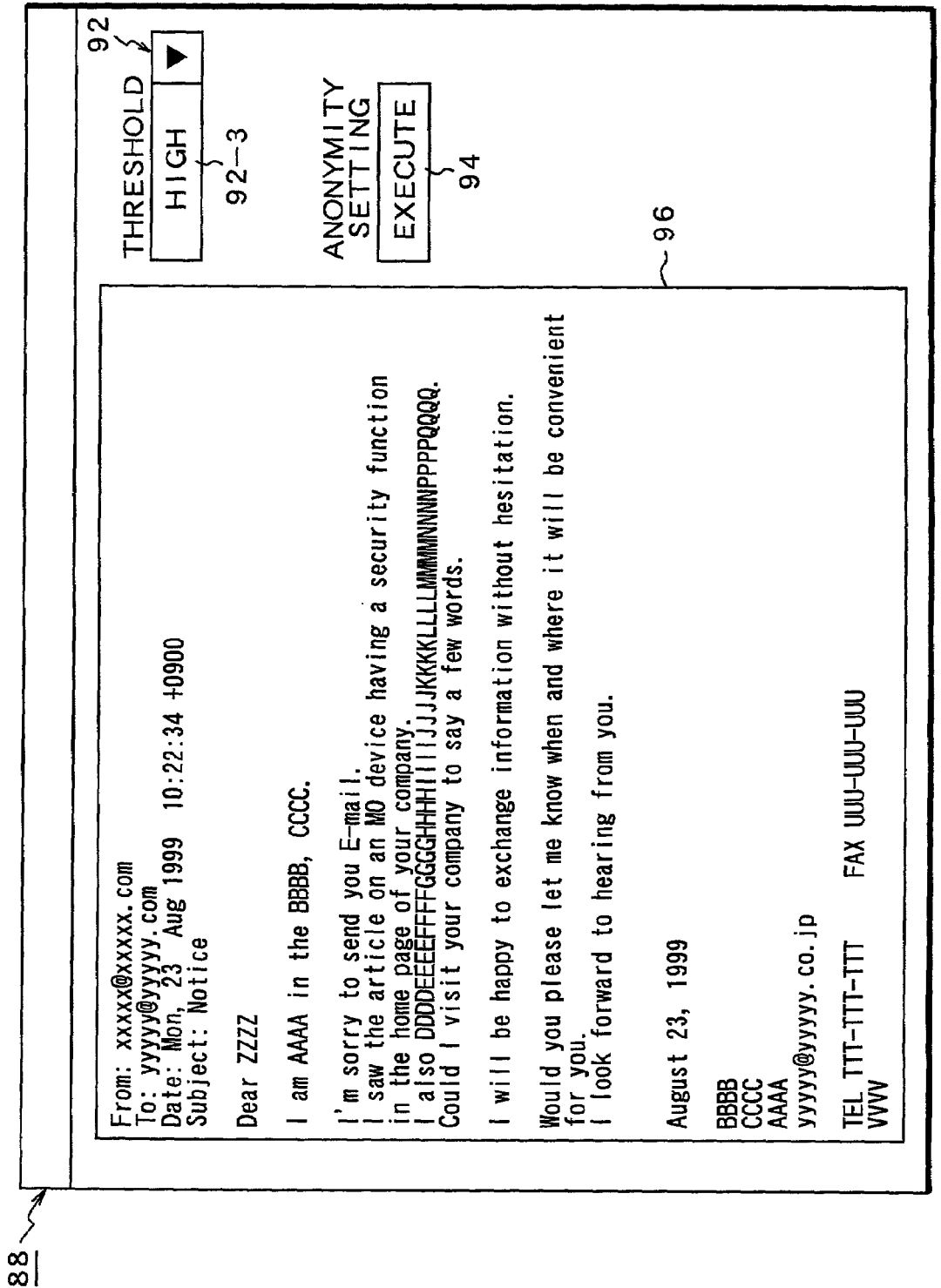
FIG. 15 is a illustrating the screen of a document is rewritten with anonymity expressions according to the present invention. In the case of FIG. 15, all expressions specifying a person are rewritten to anonymity expressions is indicated.

FIG. 15 shows the working screen 88 displaying the rewritten document 96 to be the result of a processing through the mouse click of the execution key 94 in the case in which the threshold level of the window 92 is set to be a high level 92-3. In the case in which the threshold level is thus set to be the high level, names of "White" and "John Smith" which are not subjected to the anonymity setting are also replaced with "ZZZZ" based on the anonymity setting expression if the threshold is low in FIG. 14. Thus, the degree of concealment for personal information can further be enhanced.

Next, description will be given to an embodiment of a computer readable recording medium recording a document anonymity setting program according to the present invention. The document anonymity setting program according to the present invention includes processing steps shown in the flow chart of FIG. 2. More specifically, the anonymity setting program stored in the recording medium according to the present invention causes a computer to execute a document input step of inputting a document, a specificity calculating step of extracting an expression from the input document, and rewriting step of rewriting the expressions specifying a person. Examples of the recording medium include a removable portable type recording medium such as a CD-ROM or a floppy disk, a program provider for providing a program through a line, and furthermore, and a memory device such as an RAM and a hard disk which are to be a processor installing a program. Moreover, a document anonymity setting program provided by the recording medium is loaded onto a processor and is executed on a main memory. Furthermore, the document anonymity setting program stored in the recording medium provided by the present invention preferably includes the processing functions of the document input unit 10, the specificity calculating unit 12, the reference specificity database 14, the specificity normalizing unit 16, the anonymity setting processing unit 18, the anonymity setting indicating unit 20, the non-anonymity setting requiring database 22, the anonymity setting database 24 and the threshold database 26, and furthermore, the anonymity setting document storage unit 30 shown in FIGS. 1A and 1B.

According to the present invention, as described above, the degree of specificity at which an expression specificities a person in a document is calculated before the execution of the rewriting with an anonymity expression. Personal information can be properly concealed according to anonymity setting method if the specificity value is greater than predetermined threshold for the required consequently, it is possible to rewrite a document automatically or semi-automatically at a required anonymity degree. Thus, an anonymity setting work can efficiently be carried out and a working cost can be reduced considerably.

As the present invention may be embodied in several forms without impairing the objects and advantages thereof, the values indicated in the above embodiment is therefore not restrictive.

What is claimed is:

1. An anonymity setting device comprising:
   a specificity calculating unit extracting an expression specifying a person from an input document and calculating a specificity to evaluate a degree of intensity at which the expression can specify the person; and
   an anonymity setting processing unit changing a name of the person in the input document having a specificity which is greater than a predetermined threshold;
   wherein said specificity calculating unit extracts surrounding expressions of the person's name from said input document, and calculates, for each surrounding expression, a degree of specificity for evaluating a degree of specificity at which the person can be specified with the extracted individual surrounding expressions; and
   said anonymity setting processing unit sets, when there is a surrounding expression of a degree of specificity higher than a predetermined threshold, anonymity for such surrounding expression and the person's name; and
   wherein the specificity calculating unit further includes:
   a syntax analyzing means creating a syntax tree indicative of a modification relationship between clauses based on a syntax analyzing rule from a result of a part-of-speech analysis;
   a person specifying tree extracting means extracting a tree structure specifying the person as a person modification expression based on a person specifying tree extracting rule for the tree structure obtained by the parsing unit; and
   a tree structure specificity calculating means calculating a specificity of the person specifying tree thus extracted based on statistical information.

2. An anonymity setting device comprising:
   a specificity calculating unit extracting an expression specifying a person from an input document and calculating a specificity to evaluate a degree of intensity at which the expression can specify the person; and
   an anonymity setting processing unit changing a name of the person in the input document having a specificity which is greater than a predetermined threshold;
   wherein said specificity calculating unit extracts surrounding expressions of the person's name from said input document, and calculates, for each surrounding expression, a degree of specificity for evaluating a degree of specificity at which the person can be specified with the extracted individual surrounding expressions; and
   said anonymity setting processing unit sets, when there is a surrounding expression of a degree of specificity higher than a predetermined threshold, anonymity for such surrounding expression and the person's name; and
   wherein the anonymity setting processing unit replaces an expression specifying the person extracted from the input document to a low specificity expression having a specificity which is equal to or smaller than a threshold to be used for rewriting with the anonymity expression.

3. A document anonymity setting method comprising:
   a specificity calculating step of extracting an expression specifying a person from an input document and calculating a specificity to evaluate a degree of specificity at which the expression specifies a name of the person; and
   an anonymity setting processing step of rewriting the name of the person with an anonymity expression in said input document which has a specificity higher than a predetermined threshold;
   wherein said specificity calculating step extracts surrounding expressions of the person's name from said input document, and calculates, for each surrounding expression, a degree of specificity for evaluating a degree of intensity at which the person can be specified with the extracted individual surrounding expressions; and
   said anonymity setting processing step sets, when there is a surrounding expressions of a degree of specificity higher then a predetermined threshold, anonymity for said surrounding expression and the person's name; and
   wherein the specificity calculating step further includes:
   a syntax analyzing step of creating a syntax tree indicative of a modification relationship between clauses based on a syntax analyzing rule from the result of the part-of-speech analysis;
   a tree structure specifying a person extracting step of extracting a tree structure specifying the person as a person modification expression based on a person specifying tree extracting rule for the syntax tree obtained at the syntax analyzing step; and
   a tree structure specificity calculating step of calculating a specificity of the tree structure specifying the person thus extracted based on statistical information.

4. A document anonymity setting method comprising:
   a specificity calculating step of extracting an expression specifying a person from an input document and calculating a specificity to evaluate a degree of specificity at which the expression specifies a name of the person; and
   an anonymity setting processing step of rewriting the name of the person with an anonymity expression in said input document which has a specificity higher than a predetermined threshold;
   wherein said specificity calculating step extracts surrounding expressions of the person's name from said input document, and calculates, for each surrounding expression, a degree of specificity for evaluating a degree of intensity at which the person can be specified with the extracted individual surrounding expressions; and
   said anonymity setting processing step sets, when there is a surrounding expressions of a degree of specificity higher then a predetermined threshold, anonymity for said surrounding expression and the person's name; and wherein the specificity calculating step includes:

a sentence extracting step of extracting a sentence from the input document;

a part-of-speech analyzing step of discriminating the extracted sentence for each part of speech;

a person's name extracting step of extracting the person's name based on a name extracting rule from a result of the part-of-speech analysis; and a person's name specificity calculating step of calculating a specificity of the person's name thus extracted based on statistical information; and wherein the specificity calculating step takes a weight average of a specificity obtained by a calculation of an expression which specifies the person extracted from the input document with a specificity registered in a reference specificity database registering specificity data having a set of an expression specifying the person created based on an existing document, a type of the person's name or a modification expression and a specificity, and normalizes the weight average.

5. A document anonymity setting method comprising:

a specificity calculating step of extracting an expression specifying a person from an input document and calculating a specificity to evaluate a degree of specificity at which the expression specifies a name of the person; and an anonymity setting processing step of rewriting the name of the person with an anonymity expression in said input document which has a specificity higher than a predetermined threshold;

wherein said specificity calculating step extracts surrounding expressions of the person's name from said input document, and calculates, for each surrounding expression, a degree of specificity for evaluating a degree of intensity at which the person can be specified with the extracted individual surrounding expressions; and said anonymity setting processing step sets, when there is a surrounding expressions of a degree of specificity higher then a predetermined threshold, anonymity for said surrounding expression and the person's name; and further comprising an anonymity setting indicating step of setting and changing a threshold to be used at the anonymity setting processing step.

6. A document anonymity setting method comprising:

a specificity calculating step of extracting an expression specifying a person from an input document and calculating a specificity to evaluate a degree of specificity at which the expression specifies a name of the person; and an anonymity setting processing step of rewriting the name of the person with an anonymity expression in said input document which has a specificity higher than a predetermined threshold;

wherein said specificity calculating step extracts surrounding expressions of the person's name from said input document, and calculates, for each surrounding expression, a degree of specificity for evaluating a degree of intensity at which the person can be specified with the extracted individual surrounding expressions; and said anonymity setting processing step sets, when there is a surrounding expressions of a degree of specificity higher then a predetermined threshold, anonymity for said surrounding expression and the person's name; and wherein the anonymity setting method retains, in a threshold database, a threshold used in an anonymity setting processing for each processing document and sets a last threshold as a default during the anonymity setting processing of a new input document.

7. A document anonymity setting method comprising:

a specificity calculating step of extracting an expression specifying a person from an input document and calculating a specificity to evaluate a degree of specificity at which the expression specifies a name of the person; and an anonymity setting processing step of rewriting the name of the person with an anonymity expression in said input document which has a specificity higher than a predetermined threshold;

wherein said specificity calculating step extracts surrounding expressions of the person's name from said input document, and calculates, for each surrounding expression, a degree of specificity for evaluating a degree of intensity at which the person can be specified with the extracted individual surrounding expressions; and said anonymity setting processing step sets, when there is a surrounding expressions of a degree of specificity higher then a predetermined threshold, anonymity for said surrounding expression and the person's name; and wherein the anonymity setting processing step replaces the expression specifying the person extracted from an input document with a low specificity expression having a specificity equal to or lower than a threshold which is to be used for rewriting of the expressions specifying a person.

* * * * *